UNITED STATES PATENT OFFICE.

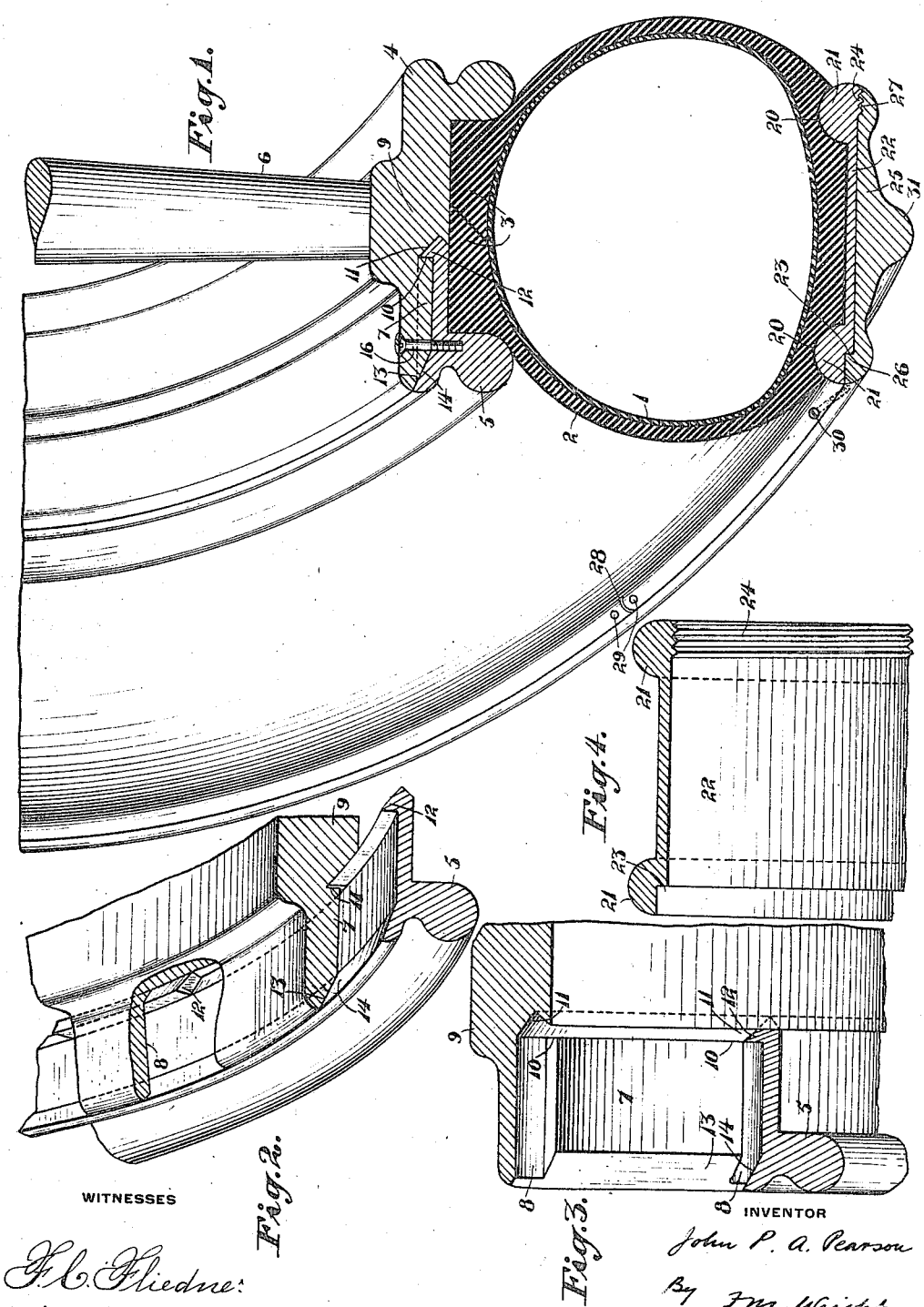

JOHN P. A. PEARSON, OF SAN FRANCISCO, CALIFORNIA.

TIRE-FASTENING.

1,093,071. Specification of Letters Patent. Patented Apr. 14, 1914.

Application filed March 28, 1911. Serial No. 617,465.

*To all whom it may concern:*

Be it known that I, JOHN P. A. PEARSON, a citizen of the United States, residing at San Francisco, in the county of San Francisco and State of California, have invented new and useful Improvements in Tire-Fastenings, of which the following is a specification.

The object of the present invention is to provide, in combination with a pneumatic tire, improved means of securing said tire to a ring, either to the rim of the wheel, or to a tread for the tire.

In the accompanying drawing, Figure 1 is a broken perspective view of a pneumatic tire equipped with my improvement; Fig. 2 is a broken detail perspective view showing the rim sections secured together; Fig. 3 is a similar view in a different position; Fig. 4 is a broken front view of the inner tread section detached.

Referring to the drawing, 1 indicates the inner tube of a pneumatic tire, and 2 the outer tube. The marginal portions of said outer tube are formed with rectangular shoulders 3, which engage rectangular recesses respectively formed in rim sections 4 and 5, of which the rim section 4 is the inner and is secured to the spokes 6, while the rim section 5 is the outer. The detailed construction of these rim sections, and the manner of securing them together, are as follows: The outer surface of the inner rim section or that surface which is in contact with the outer rim section, is recessed or cut away for less than one-half its width to receive the outer rim section and said inner portion is formed with a circumferential series of raised portions or teeth 7 having smooth surfaces and alternating with a circumferential series of recessed portions or notches 8, said teeth and notches being each of convenient length, about three inches. Said raised portions or teeth 7, are, however, not continuous transversely inward up to the main or central portion 9 of the inner section, but terminate abruptly so as to form at their inner edges rectangular shoulders 10, angular recesses 11 thus being formed between the inner edges of said teeth and the main portion 9 of the inner rim section. The outer section is formed on its inner surface with a circumferential series of angular hooks 12, adapted to fit snugly within said angular recesses 11, and spaced apart from one another at intervals slightly longer than the length of the raised portions or teeth 7.

The outer tube 2 having been placed upon the inner rim section, the outer rim section is then applied to the inner rim section so that the hooks 12 are opposite to the recesses or notches 8 of the inner rim section, and the outer rim section is then pushed inward over said inner rim section, the recesses 8 in the inner rim section permitting this to be done. When the outer rim section has been pushed inward until its inclined outer edge 14 abuts against the inclined outer edge 13 of the inner rim section, the outer rim section is then turned in either direction in the plane of the wheel, thereby causing the hooks 12 to pass into the angular recesses 11 and behind the teeth 7, so that the outer rim section is held firmly to the inner rim section against movement transverse to the plane of the wheel. To prevent the outer rim section turning upon the inner rim section in a direction in the plane of the wheel, I provide one or more screws 16, screwing the two sections together.

The outer tube is formed with annular recesses 20, rounded in cross section, which receive inwardly extending annular heads 21 formed on the inner tread section 22. The outer surface of said tread section is formed at one edge with a mortise 23, and at the other edge with screw threads 24. An outer tread section 25 is similarly formed at one edge with a tenon 26 and at the other edge with threads 27 adapted to engage threads 24. The inner tread section is preferably split, as shown at 28, and is formed adjacent to its ends with holes 29, by which said ends can be conveniently drawn together, and held in close contact with each other while the tread section is being placed in position, by a suitable U-shaped device inserted into both holes. Said outer tread section is a continuous ring and is placed in position on the inner tread section sidewise, until the threads of the outer tread section meet the threads of the inner tread section, and then the outer tread section is screwed up upon the inner tread section into the position shown in Fig. 1. A screw 30 is screwed through both tread sections to prevent the outer section unscrewing from the inner section.

The outer tread section is preferably formed with a central circumferential protuberance 31, as shown, facilitating the traveling of the vehicle over rough roads.

I claim:—

In combination with an inner rim section having its outer surface recessed on one side only, said recessed portion having a circumferential series of raised portions or teeth having smooth surfaces and alternating with a circumferential series of recessed portions or notches, and also having angular recesses between the inner edges of the teeth and the main portion of said rim section, an outer rim section formed on its inner surface with a circumferential series of angular hooks adapted to fit snugly within said recesses and spaced apart from one another at intervals slightly longer than the length of the raised portions or teeth, and means for securing said outer section to said inner section in the positions in which said angular hooks engage said recesses.

In testimony whereof I have hereunto set my hand in the presence of two subscribing witnesses.

JOHN P. A. PEARSON.

Witnesses:
 FRANCIS M. WRIGHT,
 D. B. RICHARDS.

Copies of this patent may be obtained for five cents each, by addressing the "Commissioner of Patents, Washington, D. C."